United States Patent [19]
Weinmann

[11] 3,983,968
[45] Oct. 5, 1976

[54] BICYCLE WHEEL RIM BRAKE

[75] Inventor: Otto Weinmann, Schaffhausen, Switzerland

[73] Assignee: Weinmann Ltd., Schaffhausen, Switzerland

[22] Filed: Mar. 25, 1973

[21] Appl. No.: 561,838

[30] Foreign Application Priority Data
Feb. 25, 1975 Germany............... 7505827[U]

[52] U.S. Cl.................. 188/24; 188/72.9
[51] Int. Cl.²................. B62L 1/12
[58] Field of Search............ 188/24, 59, 729

[56] References Cited
UNITED STATES PATENTS

| | | | |
|---|---|---|---|
| 2,782,874 | 2/1957 | Casey | 188/59 |
| 2,848,072 | 8/1958 | Stacy | 188/59 |
| 3,114,434 | 12/1963 | Pletscher | 188/24 |
| 3,219,153 | 11/1965 | Cadiou | 188/72.9 |

*Primary Examiner*—George E. A. Halvosa
*Attorney, Agent, or Firm*—Ernest F. Marmorek

[57] ABSTRACT

A caliper brake for the rim of a bicycle wheel, the brake having a shaft and two brake stirrups comprising a ring rivetted to the end of the shaft to prevent axial movement of the brake stirrups and a protective plastic cover on the rivetted end of the shaft. As a further improvement a plastic bushing is disposed between the stirrups and the shaft and has a flange separating the stirrups one from the other.

4 Claims, 3 Drawing Figures

BICYCLE WHEEL RIM BRAKE

BACKGROUND OF THE INVENTION

The invention relates to a caliper brake for use in braking the rim of the wheel such as a bicycle wheel.

One prior art caliper brake includes two brake stirrups or guards mounted on a shaft and secured thereon by two nuts, one at each side. Generally, one nut is a flat nut and is used with a ring or washer to abut one brake guard while the other nut acts as a lock nut.

This prior art arrangement presents the drawback that the reliable tightening of the lock nut cannot be guaranteed and, furthermore, there is a possibility that vibrations may loosen the lock nut. The release of the two brake guards constitutes a serious danger to someone depending on the braking action.

SUMMARY OF THE INVENTION

One of the principal objects of the invention is to provide a caliper brake wherein the retention of the brake guards on the mounting shaft is guaranteed.

A particular object of the invention is to provide a caliper brake for use in braking the rim of the wheel such as a bicycle wheel, including a shaft, two brake guards rotatably mounted adjacent each other on the shaft, and retaining means connected to the shaft on one side of the two brake guards and operative to provide an abutting surface for one of the two brake guards to prevent the movement of the brake guards in one axial direction, and featuring the improvement comprising a countersink ring mounted on the shaft on the other side of the two brake guards to form an abutting surface on one of its sides for the other of the two brake guards, an end portion of the shaft being deformed to engage and occupy the countersink in the ring to prevent the movement of the ring in the other axial direction.

A further object of the invention is to provide a caliper brake including the aforesaid feature and further including a protective cover over the deformed portion of the shaft.

One of the surprising advantages of the aforesaid feature of deforming the shaft is that the deformation can be carried out by riveting the shaft to the ring so that a reliable retention of the brake guards on the shaft is obtained by an economical process. Since it is known that the riveting is likely to destroy part of the galvanic surface coating of the shaft, protective means such as a plastic cap are used to cover the deformed end of the shaft to provide protection against corrosion.

The use of a protective cover provides the further advantage that the cover can be used to economically carry a manufacturer's name or some other message.

The invention also provides a decided advantage over the prior art double screw connection in that a flat end construction is obtained.

Other objects of the invention will, in part, be obvious and will, in part, appear hereinafter.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawing, in which.

DESCRIPTION OF THE PREFERRED EMBODIMENT

Figure 1:
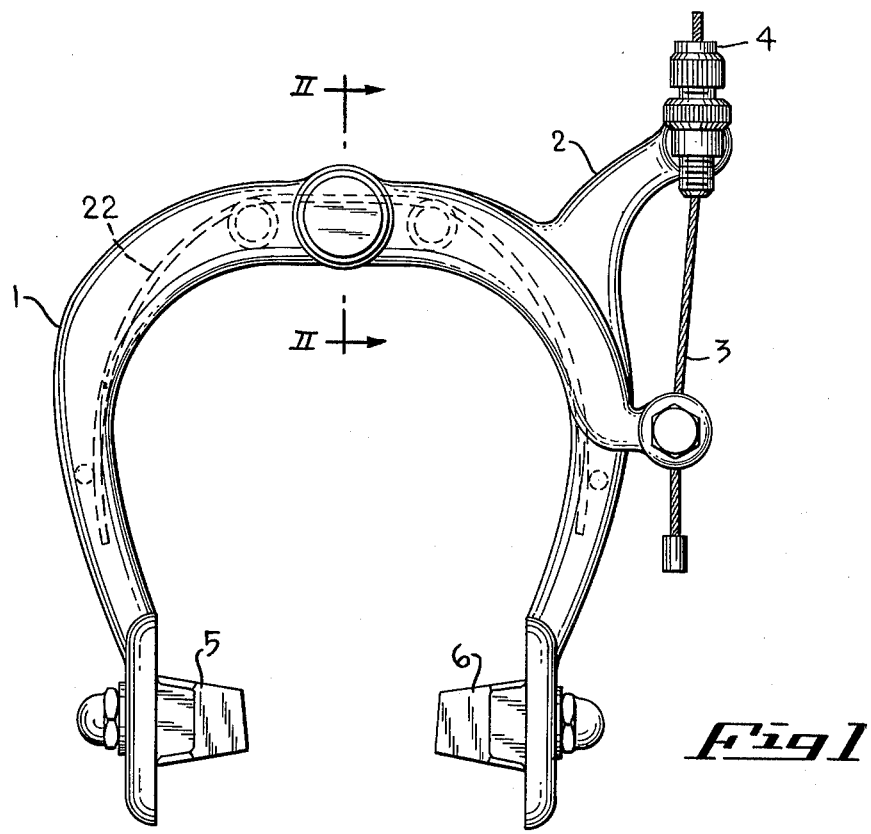
FIG. 1 is a front elevational view of a caliper brake according to the instant invention.
Figure 2:
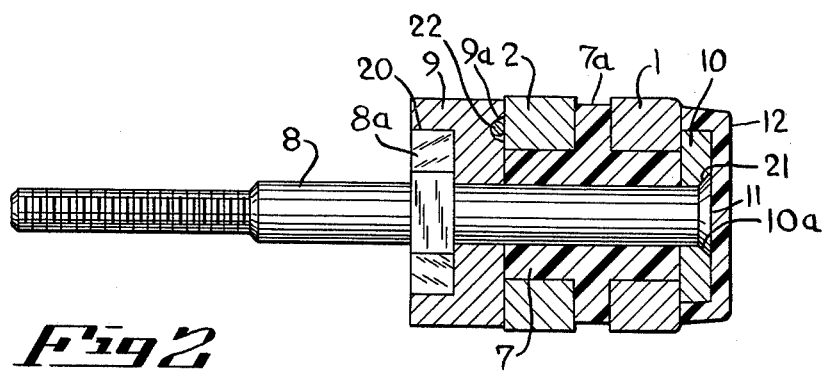
FIG. 2 is a fragmentary elevational view, on an enlarged scale, and partially in section taken along the line II—II of the invention shown in FIG. 1.
Figure 3:
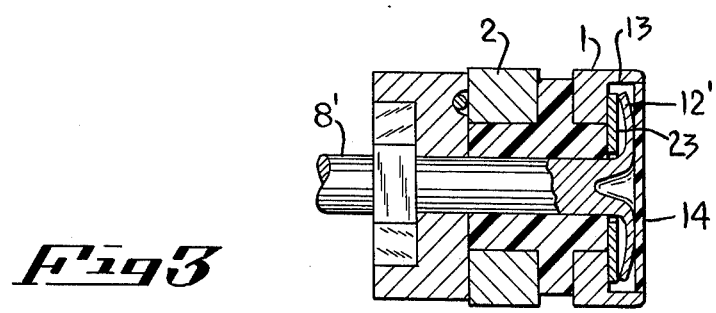
FIG. 3 is a view similar to FIG. 2 of a further embodiment of the instant invention.

In carrying the invention into effect, embodiments have been selected for illustration in the accompanying drawings and for description in the specification and reference is had to FIGS. 1 to 3.

Brake stirrups or guards 1 and 2 are rotatably mounted adjacent each other on a shaft 8, the brake guards 1 and 2 are interconnected by a cable 3 and an end stop 4 of the Bowden control system type. Brake shoes 5 and 6 are mounted, respectively, on the brake guards 1 and 2.

The brake guards 1 and 2 are supported on the shaft 8 by means of a bushing 7 which can be made of plastic.

For the embodiment shown in FIG. 2, the shaft 8 is provided with a flange such as a six-sided flange 8a onto which a pressure die cast cap 9 having a similarly shaped recess 20 is matingly engaged. The cap 9 has a slot 9a therein to serve for mounting a spring such as a torsion spring 22 or the like to force apart the brake guards 1 and 2 from each other.

The spacing between the brake guards 1 and 2 is determined by a flange 7a of the bushing 7. The pressure die cast cap 9 abuts the brake guard 2 to prevent the movement of the brake guards 1 and 2 in one axial direction. On the other side of the brake guards 1 and 2, there is mounted a ring such as a brass ring 10, removal of the ring 10 is prevented by deforming, after emplacement, an end portion of the shaft 8, such as by riveting, to engage at a hole 21 the ring 10 thereby reliably to secure the brake guards 1 and 2 around the shaft 8. The ring 10 has a bore 10a which enlarges conically away from the brake guards 1 and 2 to define the countersink hole 21 and thereafter to simplify the riveting.

Generally, the shafts used for the caliper brake are galvanized to prevent corrosion. However, it is known that the riveting of the shaft 8 is likely to damage the rivet surface 11 of the shaft 8. Corrosion of the rivet surface 11 can be prevented by the use of a protective cover such as plastic cap 12 which covers the ring 10 as shown in FIG. 2 and is snap-locked with the ring 10 by its inwardly drawn rim.

FIG. 3 shows a further modification wherein the brake guard 1 has a cavity 13 defined therein, the shaft 8' is deformed by riveting or rolling over a tip portion 12' which then lies within the cavity 13, a flat cap 14 encloses the rivet surface 11 substantially flush with the external surface of the brake guard 2. A ring 23 is placed underneath the riveted or rolled over top portion 12'.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A caliper brake for use in braking the rim of a bicycle wheel having a shaft and two brake stirrups rotatably mounted adjacent each other on said shaft and retaining means mounted on said shaft at the outer side of the outer brake stirrup to provide an abutting surface to prevent movement of the brake stirrups in an axial direction, the improvement comprising:

said retaining means comprising a ring and a rivet, said ring being rivetted by the head of said rivet between said rivet head and at least one of said two brake stirrups at the outer end of said shaft; and a cover disposed over not more than the outer surface of said rivet and ring.

2. The caliper brake according to claim 1, wherein said cover is composed of plastic material.

3. The caliper brake according to claim 1 further comprising a bushing disposed between said brake stirrups and said shaft, said bushing defining a flange separating said stirrups from each other.

4. The caliper brake according to claim 3, wherein said bushing is composed of plastic material.

* * * * *